United States Patent
Shimokawa et al.

(10) Patent No.: US 7,252,897 B2
(45) Date of Patent: Aug. 7, 2007

(54) MAGNETIC RECORDING DISK AND PROCESS FOR MANUFACTURE THEREOF

(75) Inventors: Koichi Shimokawa, Tokyo (JP); Kota Hara, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/653,429

(22) Filed: Sep. 3, 2003

(65) Prior Publication Data

US 2004/0072034 A1 Apr. 15, 2004

(30) Foreign Application Priority Data

| Sep. 3, 2002 | (JP) | ............................. 2002-257364 |
| Sep. 6, 2002 | (JP) | ............................. 2002-260787 |
| Feb. 19, 2003 | (JP) | ............................. 2003-041319 |

(51) Int. Cl.
*G11B 5/725* (2006.01)

(52) U.S. Cl. ................. 428/833; 428/833.4; 428/835.8

(58) Field of Classification Search ................. 428/421, 428/694 TF, 833.4, 835.8
See application file for complete search history.

(56) References Cited

U.S. PATENT DOCUMENTS

| 4,194,983 | A | * | 3/1980 | Paciorek et al. ............. 508/548 |
| 5,128,216 | A | * | 7/1992 | Ng ......................... 428/694 BP |
| 5,587,217 | A | | 12/1996 | Chao et al. |
| 5,718,942 | A | * | 2/1998 | Vurens et al. ............... 427/127 |
| 5,858,536 | A | * | 1/1999 | Yanagisawa ................ 428/408 |
| 5,908,817 | A | * | 6/1999 | Perettie et al. .............. 508/422 |
| 6,238,796 | B1 | | 5/2001 | Liu et al. |
| 6,559,108 | B1 | * | 5/2003 | Howell et al. .............. 508/427 |
| 6,605,335 | B2 | | 8/2003 | Tani et al. |
| 6,624,984 | B2 | * | 9/2003 | Lewis et al. ............. 360/294.7 |
| 6,627,302 | B1 | * | 9/2003 | Tang et al. ................. 428/212 |
| 6,643,098 | B2 | * | 11/2003 | Takahashi ................. 360/234.3 |
| 6,673,429 | B1 | * | 1/2004 | Ma et al. .................. 428/833.6 |
| 6,686,019 | B1 | * | 2/2004 | Liu et al. .................... 428/65.8 |
| 6,753,060 | B1 | * | 6/2004 | Liu et al. .................... 428/65.4 |
| 2002/0006531 | A1 | | 1/2002 | Hiroshi et al. |

FOREIGN PATENT DOCUMENTS

| JP | 62-066417 | | 3/1987 |
| JP | 8-319491 | | 12/1996 |
| JP | 10-027341 | | 1/1998 |
| JP | 11-224419 | | 8/1999 |
| JP | 2000-003512 | | 1/2000 |
| JP | 2000-260017 | | 9/2000 |
| JP | 2001-187796 | | 7/2001 |
| JP | 2001-236638 | | 8/2001 |
| JP | 2003-132520 A | * | 5/2003 |
| WO | WO 01/21630 | | 3/2001 |

OTHER PUBLICATIONS

"Principles of Polymerization" by G. Odian, 3rd Edition, 1991, John Wiley & Sons, Inc, NY, pp. 19-24.*
JPO Abstract Translation of JP 2003-132520 A (Abstract-Pub-No. JP2003132520A, May 2003).*

* cited by examiner

*Primary Examiner*—Kevin M. Bernatz
(74) *Attorney, Agent, or Firm*—Nixon & Vanderhye P.C.

(57) ABSTRACT

A magnetic recording disk having a substrate, a magnetic layer formed on the substrate, a protective layer formed on the magnetic layer and a lubricant layer formed on the protective layer, the lubricant layer containing a perfluoropolyether compound having an end moiety containing a phosphazene ring and a perfluoropolyether compound having an end moiety containing a hydroxyl group, or the lubricant layer containing a perfluoropolyether compound having an end moiety containing a hydroxyl group on the protective layer side and a perfluoropolyether compound having an end moiety containing a phosphazene ring on the other surface side, and a process for manufacturing each of these magnetic recording disks.

6 Claims, 1 Drawing Sheet

MAGNETIC RECORDING DISK AND PROCESS FOR MANUFACTURE THEREOF

This application claims priority to Japanese Application No. 2002-257364, filed 3 Sep. 2002 and Japanese Application No. 2002-260787, filed 6 Sep. 2002 and Japanese Application No. 2003-041319 filed 19 Feb. 2003. The entire contents of this application is incorporated herein by reference.

TECHNICAL BACKGROUND

1. Field of the Invention

The present invention relates to a magnetic recording disk and a process for the manufacture thereof. More specifically, the present invention relates to a magnetic recording disk which has a highly adhesive lubricant layer having so that it not only permits a stable operation without any difficulty at an extremely low level of flying height, for example, of 12 nm or less but also prevents migration even at a high-speed rotation, for example, of 5,400 rpm or more and which is to be mounted on a magnetic recording disk unit such as a hard disk drive unit (HDD), and a process for manufacture thereof.

2. Statement of Related Art

Conventionally, a magnetic recording disk unit employs a CSS (Contact Start and Stop) method in which a magnetic head is kept in contact with a contact start and stop region (CSS region) formed in an inner-circumferential region at a stop time, the magnetic head is allowed to come up slightly at a starting time while it was allowed to contact-slide in the CSS region, and writing and reading are performed in the surface of a write-read disk region formed outside the CSS region. When the operation is ended, the magnetic head is brought back to the CSS region from the write-read disk region and then allowed to land while it was allowed to contact-slide in the CSS region, and the magnetic head is stopped. The starting operation and ending operation which involve the contact-sliding in the above CSS method will be called a CSS operation.

In a magnetic recording disk for use in the above CSS method, it is required to form both a CSS region and a write-read region on the disk surface. For preventing the attachment (stiction) of the magnetic head and the magnetic recording disk when they are in contact, further, it is required to form a roughened form having a predetermined surface roughness called a texture on the magnetic recording disk surface. For alleviating damage caused by the contact-sliding of the magnetic head and the magnetic recording disk during the CSS operation, there are known, for example, a magnetic recording medium (e.g., JP-A-62-66417) having a coating formed of a perfluoroalkylpolyether having the structural formula, and a lubricant containing a phosphazene compound as a main component and being to be applied to a hard magnetic recording disk (e.g., JP-A-11-224419).

Recently, the above CSS method is being replaced with a magnetic recording disk according to a load unload method. The load unload method will be called "LUL method" hereinafter. In the LUL method, a magnetic head is kept on a sloping seat called a ramp positioned outside a magnetic recording disk at a stop time, and at a starting time, the magnetic head is allowed to slide from the above ramp onto the magnetic recording disk after the magnetic recording disk starts turning, followed by writing and reading. The above series of operations will be called "LUL operation". The LUL method is preferred for increasing the information capacity since a wider writing and reading region on the magnetic recording disk can be secured. Further, since it is not required to form the texture for CSS on the magnetic recording disk surface, the magnetic recording disk surface can be smoothened to a great extent, and the flying height of the magnetic head can be further decreased, so that a higher S/N ratio of recording signals can be attained. The LUL method is therefore suitable.

As the flying height of the magnetic head is further decreasing due to the introduction of the above LUL method, it is required to attain stable operation of the magnetic head even at an extremely low level of a flying height of 12 nm or less. However, when the magnetic head is allowed to fly above a magnetic recording disk surface at such a very low flying height level, there is caused a problem that fly sticking and head corrosion problems frequently take place.

The fly sticking problem refers to a problem that a magnetic head is caused to have a fluctuation in flying position and a flying height level during its flying. The problem involves irregular fluctuations in reproduction output, and a magnetic head comes into contact with a magnetic recording disk to cause a head clash in some cases, and the magnetic recording disk may be destroyed.

The corrosion problem refers to a problem that the element portion of a magnetic head is corroded to cause difficulties in reproducing written data, and in some cases, the reproduction may be no longer possible, or the corroded element may expand to cause damage on the magnetic recording disk surface during the flying of the magnetic head.

Further, it is recent practice to increase the turning rate of a magnetic recording disk for enhancing the response of a magnetic recording disk drive unit. Conventionally, the small 2.5-inch magnetic recording disk drive unit suitable for mobile devices has a turning rate of approximately 4,200 rpm, while it is recent practice to turn a magnetic recording disk at a high rate of 5,400 rpm or more for increasing the response capability. When a magnetic recording disk is turned at such a high rate, a lubricant layer moves (migrates) due to a centrifugal force caused by the turning, and there comes to clearly appear a phenomenon in which the lubricant layer comes to have a non-uniform thickness in the magnetic recording disk surface. When the thickness of the lubricant layer increases on the outer-circumferential side of the disk, a fly sticking problem or a head clash problem is liable to take place at the time of LUL. When the thickness of the lubricant layer decreases on the inner-circumferential side of the disk, the lubricity performance decreases, and a head clash problem is liable to take place.

When a conventional lubricant described in JP-A-62-66417 or a conventional lubricant described in JP-A-11-224419 is used, the above problems take place highly frequently, and it is difficult to satisfy the reliability that magnetic recording disks are recently required to have. It is therefore made difficult to attain higher capacity of a magnetic recording disk, a higher S/N ratio and faster response.

Under the circumstances, it is therefore an object of the present invention to provide a magnetic recording disk that permits a stable operation without any hindrance at an extremely low level of flying height, for example, of 12 nm or less, and which has a highly adhesive lubricant layer whose migration can be prevented at a turning rate, for example, of 5,400 rpm or more, and a process for the manufacture thereof. Particularly, the present invention aims at providing a magnetic recording disk suitable for the LUL method and a process for the manufacture thereof.

SUMMARY OF THE INVENTION

For achieving the above object, the present inventors have made diligent studies on the above problems that recently appear in magnetic recording disks, and it has been found that the problems are results of the occurrence of the following mechanism.

When the flying height of a magnetic head comes to be an extremely small flying height of 12 nm or less, the magnetic head exerts adiabatic compression and adiabatic expansion repeatedly on a lubricant layer on the surface of a magnetic recording disk through air molecules during its flying, and the lubricant layer is repeatedly heated and cooled by the above thermal action. From this point of view, the present inventors have made further studies and found that the above thermal action promotes the pyrolysis of a lubricant constituting the lubricant layer so that the lubricant is reducible to lower molecules. When the lubricant is reduced to low molecules due to the pyrolysis, the flowability of the lubricant increases due to its lower molecules, so that the adhesion between the lubricant layer and a protective layer is degraded. As a result, lubricant having an increased flowability is transferred to, and deposited on, a magnetic head positioned within an extremely small distance from the magnetic recording disk, so that the flying position of the magnetic head is destabilized, which causes a fly sticking problem.

Particularly, it has been found that a magnetic head having a recently introduced NPAB (negative pressure air bearing surface) slider sucks a decomposition product of a lubricant from the surface of magnetic recording disk due to a high negative pressure that occurs on the lower surface of the magnetic head, which promotes the transfer and deposition phenomenon.

It has been also found that the lubricant, when thermally decomposed, forms hydrofluoric acid in some cases, and that the hydrofluoric acid is liable to corrode the element portion of a magnetic head as a result of transfer thereof to the magnetic head.

It has been further found that a magneto-resistance effect reproducing element (MR, GMR, TMR, etc.) used in a magnetic head as being suitable for higher-density recording is easily corroded, and that a shielding material that gives a high magnetic flux density such as FeNi-containing permalloy, which is used in the shielding portion of a magnetic head having a magneto-resistance effect reproducing element, is also liable to be corroded.

Particularly, it has been found that the lubricant described in the above JP-A-62-66417 has low heat durability, tends to be thermally decomposed and is therefore liable to cause problems due to these phenomena.

It has been further found that the hydrofluoric acid generated by the pyrolysis of a lubricant tends to cause siloxane present in the atmosphere of a magnetic recording disk device to chemically change to form silicon oxide and that the thus-formed silicon oxide is liable Lo be transferred to a magnetic head to cause a fly sticking problem.

The present inventors have further found that the LUL method aggravates the above problems. In the LUL method, a magnetic head does not slide on the surface of a magnetic recording disk while being in contact thereto unlike the CSS method, so that a decomposition product of a lubricant that is once transferred to the magnetic head is no longer transferred, or removed back, to the magnetic recording disk side. In the CSS method, the CSS region of a magnetic recording disk works to clean away a decomposition product adhering to a magnetic head during the CSS operation, and it is thought that the above problems therefore do not appear clearly.

The present inventors have made further studies on the basis of the above results and found that the above problems can be suppressed by forming a lubricant layer containing a perfluoropolyether compound having an end moiety containing a phosphazene ring and a perfluoropolyether compound having an end moiety containing a hydroxyl group as a lubricant layer on a magnetic recording disk.

It has been also found that the above problems can be overcome when a lubricant layer is formed so as to have a layer containing a perfluoropolyether compound having an end moiety containing a hydroxyl group on a protective layer side and a layer containing a perfluoropolyether compound having an end moiety containing a phosphazene ring on the other surface side.

The present invention has been accordingly completed on the basis of the above finding.

In the present specification, the term "an end moiety" and "a hydroxyl group" of the perfluoropolyether compounds are generic expressions and include the meanings of "a single end moiety" and "a single hydroxyl group" and the meanings of "two or more end moieties" and "two or more hydroxyl groups".

According to the present invention, there are provided;

(1) a magnetic recording disk comprising a substrate, a magnetic layer formed on the substrate, a protective layer formed on the magnetic layer and a lubricant layer formed on the protective layer, the lubricant layer containing a perfluoropolyether compound having an end moiety containing a phosphazene ring and a perfluoropolyether compound having an end moiety containing a hydroxyl group, (2) a magnetic recording disk as recited in the above (1), wherein the perfluoropolyether compound having an end moiety containing a phosphazene ring is a compound having a structure of the general formula (I), wherein $R^1$ is a group represented by the formula (A), $R^2$ is a hydrogen atom or a group of the above formula (A), and each of p and q is an integer of 1 or greater, (3) a magnetic recording disk as recited in the above (2), wherein the perfluoropolyether compound having an end moiety containing a phosphazene ring has a weight average molecular weight of 2,000 to 7,000 and a polydispersity [Mw/Mn] (molecular weight dispersion degree) of 1.1 or less, (4) a magnetic recording disk as recited in the above (1), (2) or (3), wherein the perfluoropolyether compound having an end moiety containing a hydroxyl group is a perfluoropolyether compound having an end moiety containing two or more hydroxyl groups, (5) a magnetic recording disk as recited in the above (4), wherein the perfluoropolyether compound having an end moiety containing a hydroxyl group is a compound having a structure of the formula (II) or (III), wherein each of m, n, a, b, c and d is an integer of 1 or greater, (6) a magnetic recording disk as recited in the above (5), wherein the perfluoropolyether compound having an end moiety containing a hydroxyl group has a weight average molecular weight of 2,000 to 8,000 and a polydispersity [Mw/Mn] of 1.25 or less, (7) a magnetic recording disk as recited in any one of the above (1) to (6), wherein the lubricant layer contains the perfluoropolyether compound having an end moiety containing a phosphazene ring and the perfluoropolyether compound having an end moiety containing a hydroxyl group in a weight ratio of 2:8 to 8:2, (8) a magnetic recording disk as recited in any one of the above (1) to (7), which is for use in a load unload method,

(9) a process for manufacturing a magnetic recording disk, which comprises forming a magnetic layer on a substrate, forming a protective layer on the magnetic layer and forming a lubricant layer on the protective layer, the method comprising forming the lubricant layer from a lubricant containing a perfluoropolyether compound having an end moiety containing a phosphazene ring and a perfluoropolyether compound having an end moiety containing a hydroxyl group, (10) a magnetic recording disk comprising a substrate, a magnetic layer formed on the substrate, a protective layer formed on the magnetic layer and a lubricant layer formed on the protective layer, the lubricant layer containing a perfluoropolyether compound having an end moiety containing a hydroxyl group on the protective layer side and containing a perfluoropolyether compound having an end moiety containing a phosphazene ring on the other surface side, (11) a magnetic recording disk as recited in the above (10), wherein the lubricant layer has a structure in which a second lubricant layer containing a perfluoropolyether compound having an end moiety containing a phosphazene ring is formed on a first lubricant layer containing a perfluoropolyether compound having an end moiety containing a hydroxyl group, (12) a magnetic recording disk as recited in the above (10) or (11), wherein the perfluoropolyether compound having an end moiety containing a hydroxyl group is a perfluoropolyether compound having an end moiety containing three or more hydroxyl groups,

(13) a magnetic recording disk as recited in the above (12), wherein the perfluoropolyether compound having an end moiety containing a hydroxyl group is a compound having a structure of the general formula (IV), wherein each of r and s is an integer of 1 or greater, (14) a magnetic recording disk as recited in the above (13), wherein the perfluoropolyether compound having an end moiety containing a hydroxyl group has a weight average molecular weight of 2,000 to 7,000 and a polydispersity[Mw/Mn] of 1.2 or less, (15) a magnetic recording disk as recited in any one of the above (10) to (14), wherein the perfluoropolyether compound having an end moiety containing a phosphazene ring is a compound having a structure of the general formula (I), wherein R¹ is a group represented by the formula (A), R2 is a hydrogen atom or a group of the above formula (A), and each of p and q is an integer of 1 or greater, (16) a magnetic recording disk as recited in the above (15), wherein the perfluoropolyether compound having an end moiety containing a phosphazene ring has a weight average molecular weight of 2,000 to 7,000 and a polydispersity[Mw/Mn] of 1.1 or less, (17) a process for manufacturing a magnetic recording disk, which comprises forming a magnetic layer on a substrate, forming a protective layer on the magnetic layer and forming a lubricant layer on the protective layer, the method comprising forming a layer from a lubricant containing a perfluoropolyether compound having an end moiety containing a hydroxyl group and then forming a layer from a perfluoropolyether compound having an end moiety containing a phosphazene ring to form the lubricant layer, and (18) a process for fabricating a magnetic recording disk as recited in the above (17), which comprises forming a first lubricant layer from a solution of a perfluoropolyether compound having an end moiety containing a hydroxyl group (Compound A) in a fluorine-containing solvent capable of dispersing or dissolving Compound A and forming a second lubricant layer from a solution of a perfluoropolyether compound having an end moiety containing a phosphazene ring (Compound B) in a fluorine-containing solvent which is capable of dispersing or dissolving Compound B but substantially does not disperse or dissolve Compound A.

The invention directed to the subject matters of the above (1) to (9) will be sometimes referred to as "present first invention", and the invention directed to the subject matters of the above (10) to (18) will be sometimes referred to as "present second invention", hereinafter.

The process for manufacturing the magnetic recording disk according to the above present first invention preferably includes;

(19) a process as recited in the above (9), wherein the perfluoropolyether compound having an end moiety containing a phosphazene ring has a structure represented by the above general formula (I), (20) a process as recited in the above (19), wherein the perfluoropolyether compound having an end moiety containing a phosphazene ring has a weight average molecular weight of 2,000 to 7,000 and a polydispersity[Mw/Mn] of 1.1 or less, (21) a process as recited in the above (9), (19) or (20), wherein the perfluoropolyether compound having an end moiety containing a hydroxyl group is a perfluoropolyether compound having an end moiety containing two or more hydroxyl groups, (22) a process as recited in the above (21), wherein the perfluoropolyether compound having an end moiety containing a hydroxyl group is a compound having a structure represented by the above general formula (II) or (III), (23) a process as recited in the above (22), wherein the perfluoropolyether compound having an end moiety containing a hydroxyl group has a weight average molecular weight of 2,000 to 8,000 and a polydispersity[Mw/Mn] of 1.25 or less, (24) a process as recited in any one of the above (9) and (19) to (23), wherein the magnetic recording disk is for use in the load unload method, and (25) a process as recited in any one of the above (9) and (19) to (24), wherein the lubricant contains a perfluoropolyether compound having an end moiety containing a phosphazene ring and a perfluoropolyether compound having an end moiety containing a hydroxyl group in a weight ratio of 2:8 to 8:2.

The process for manufacturing the magnetic recording disk according to the above present second invention preferably includes;

(26) a process as recited in the above (17) or (18), wherein the perfluoropolyether compound having an end moiety containing a hydroxyl group is a perfluoropolyether compound having an end moiety containing three or more hydroxyl groups, (27) a process as recited in the above (26), wherein the perfluoropolyether compound having an end moiety containing a hydroxyl group is a compound having a structure represented by the above general formula (IV), (28) a process as recited in the above (27), wherein the perfluoropolyether compound having an end moiety containing a hydroxyl group has a weight average molecular weight of 2,000 to 7,000 and a polydispersity[Mw/Mn] of 1.2 or less, (29) a process as recited in any one of the above (17) and (26) to (28), wherein the perfluoropolyether compound having an end moiety containing a phosphazene ring is a compound having a structure represented by the above general formula (I), and (30) a process as recited in the above (29), wherein the perfluoropolyether compound having an end moiety containing a phosphazene ring has a weight average molecular weight of 2,000 to 7,000 and a polydispersity[Mw/Mn] of 1.1 or less.

PREFERRED EMBODIMENTS OF THE INVENTION

First, the present first invention will be explained below.

The magnetic recording disk according to the present first invention has a constitution comprising a substrate, a magnetic layer, a protective layer and a lubricant layer, the magnetic layer being formed on a substrate, the protective layer being formed on the magnetic layer, the lubricant layer being formed on the protective layer. And, the lubricant layer contains a perfluoropolyether compound having an end moiety containing a phosphazene ring and a perfluoropolyether compound having an end moiety containing a hydroxyl group.

A perfluoropolyether compound having an end moiety containing a phosphazene ring is suitable as a lubricant, since it has both a flexible lubrication performance of a perfluoropolyether main chain and high heat resistance of an end functional group containing a phosphazene ring. Since, however, the phosphazene ring has poor adhesion to a protective layer, the lubricant is easily sucked to a magnetic head, and a fly sticking problem or the migration problem is liable to take place. It is therefore difficult to use it alone suitably, which was a problem that the present inventors intended to overcome.

The other perfluoropolyether compound having an end moiety containing a hydroxyl group is suitable as a lubricant since it has both a flexible lubrication performance of a perfluoropolyether main chain and high adhesion of an end function group having a hydroxyl group to a protective layer. However, it has poor heat resistance, which was a problem that the present inventors intended to overcome. Further, when the number of the end hydroxyl groups is too large, the adhesion of the lubricant to the protective layer is too strong, and as a result, the lubricant is impaired in lubrication performance and is liable to cause head clash. When the number of the end hydroxyl groups is too small, the adhesion of the lubricant to the protective layer is too low, and the lubricant is liable to cause a fly sticking problem or the migration problem, so that the it is difficult to control the lubrication performance. It is therefore difficult to use the perfluoropolyether compounds independently, which was a problem that the present inventors sought to overcome.

However, when the present inventors have prepared a magnetic recording disk having a lubricant layer containing both of the above perfluoropolyether compounds and tested it, unexpectedly, it has been found that their suitable properties are uniquely intensified and that their defects can be suppressed, which has led to the present first invention.

In the present first invention, the perfluoropolyether compound having an end moiety containing a phosphazene ring is not specially limited and can be selected from known such compounds that are conventionally used in a lubricant layer of a magnetic recording disk, as required. Above all, preferred is a compound having a structure represented by the general formula (I), (I)

wherein $R^1$ is a group of the formula (A), (A)

$R2$ is a hydrogen atom or a group of the above formula (A), and each of p and q is an integer of 1 or greater.

In the above general formula (I), the perfluoropolyether main chain is represented by $-CF_2(OCF_2CF_2)_p(OCF_2)_q OCF_2-$, and the end moiety is represented by $R^1-OCH_2-$ or $R_2-OCH_2-$.

In the above general formula (I), $R^1$ is a group of the above formula (A). In the group of the above formula (A), each of three phosphorus atoms of the phosphazene ring has two substituents, or three phosphorus atoms have six substituents in total, and of these substituents, five substituents are trifluromethylphenoxy, and the remaining one substituent constitutes the perfluoropolyether main chain. The position of $CF_3$ group of each of the above trifluoromethylphenoxy groups is not specially limited, and it may be any one of o-, m- and p-positions but is preferably an m-position in view of performances.

When $R^2$ is a hydrogen atom in the compound of the above general formula (I), the compound of the general formula (I) is a compound having one end moiety containing a phosphazene ring bonded to one side of the perfluoropolyether main chain and the other end moiety containing a hydroxyl group on the other side (to be referred to as "Compound I-a" hereinafter). Further, when $R^2$ is a group of the formula (A), the compound of the general formula (I) is a compound in which both the end moieties bonded to the perfluoropolyether main chain contain a phosphazene ring each (to be referred to as "Compound I-b" hereinafter).

In the present first invention, any one of the above Compound I-a and Compound I-b may be used, and one of these Compounds may be used alone. In view of performance of adhesion to the protective layer, Compound I-a is preferred. When a mixture of Compounds I-a and I-b is used, it is preferred to use a mixture containing Compound I-a as a main component.

Preferably, the perfluoropolyether compound having an end moiety containing a phosphazene ring, represented by the above general formula (I), has a weight average molecular weight (Mw) of 2,000 to 7,000 and a polydispersity[Mw/Mn] of 1.1 or less. When the perfluoropolyether compound having an end moiety containing a phosphazene ring has the above molecular weight distribution, the compound is suitable as a lubricant having a perfluoropolyether main chain length (length of a main chain) with a lubrication performance suitable for a magnetic recording disk.

When the above weight average molecular weight is less than 2,000, undesirably, a large amount of impurities may be contained in some cases. When it exceeds 7,000, undesirably, the compound has a high viscosity and may cause fly sticking in some cases. When the polydispersity[Mw/Mn] exceeds 1.1, the molecular weight distribution is too broad, and undesirably, low molecular weight components and high molecular weight components come to be contained in a large amount.

In the compound of the above general formula (I), each of p and q is an integer of 1 or greater, and preferably, p and q are determined so that the compound has a weight average molecular weight in the range of 2,000 to 7,000. The term "polydispersity[Mw/Mn]" refers to a ratio of weight average molecular weight (Mw)/number average molecular weight (Mn). In the present first invention and the present second invention to be described later, the above weight average molecular weight (Mw) and the above number average molecular weight are values measured by a gel permeation chromatography (GPC) method using polymethyl methacrylates having different molecular weights as reference substances (hereinafter, weight average molecular weights and number average molecular weights refer to values measured by the above method).

In the present first invention, the perfluoropolyether compound having an end moiety containing a hydroxyl group, which is contained in the lubricant layer together with the above perfluoropolyether compound having an end moiety containing a phosphazene ring, is preferably a perfluoropolyether compound having an end moiety containing two or more hydroxyl groups as a total. When the number of the hydroxyl groups is less than 2, the lubricant shows insufficient performance of adhesion to the protective layer and is liable to cause a fly sticking problem or migration problem. When the total number of hydroxyl groups of the end moiety is too large, the performance of adhesion to the protective layer is too strong. As a result, the lubricant is impaired in lubrication performance and is liable to cause a head clash problem.

The perfluoropolyether compound having an end moiety containing two or more hydroxyl groups as a total is not specially limited and can be selected from known compounds that can be used in a lubricant layer of a magnetic recording disk. Above all, the above perfluoropolyether compound can be selected from a compound of the general formula (II) or a compound of the general formula (III), containing two hydroxyl groups each, and the compound of the general formula. (III) has a perfluoropolyether main chain having end functional groups containing one hydroxyl group each, so that each compound has affinity with the protective layer to a proper degree and works for suitable adhesion of the lubricant layer to the protective layer.

The above perfluoropolyether compound having an end moiety containing a hydroxyl group preferably has a weight average molecular weight of 2,000 to 8,000, more preferably 2,000 to 7,000, still more preferably 3,000 to 6,000, and the polydispersity[Mw/Mn] thereof is preferably 1.25 or less, more preferably 1.2 or less, still more preferably 1.1 or less. When the above weight average molecular weight is less than 2,000, undesirably, a large amount of impurities may be contained in some cases. When it exceeds 8,000, undesirably, the compound has a high viscosity and may cause fly sticking in some cases. When the polydispersity[Mw/Mn] exceeds 1.25, the molecular weight distribution is too broad, and undesirably, low molecular weight components and high molecular weight components come to be contained in a large amount. When the above compound has the above molecular weight distribution, the compound is suitable as a lubricant having a perfluoropolyether main chain length (length of a main chain) with a lubrication performance suitable for a magnetic recording disk. Particularly, a lubricant containing a compound of the general formula (II) is liable to contain lower molecular weight compounds having an end moiety containing fewer hydroxyl groups than the wherein each of m, n, a, b, c and d is an integer of 1 or more.

In the above general formula (II), the perfluoropolyether main chain is represented by and the end moiety is represented by the following group.

In the above general formula (III), the perfluoropolyether main chain is represented by and the end moiety is represented by or The compound of the above general formula (II) has a perfluoropolyether main chain having end functional groups end moiety of the compound of the general formula (II) and is also liable to contain impurities. However, when the molecular weight distribution as defined in the present invention is employed, such compounds and impurities can be excluded, and the function of the present invention can be suitably exhibited.

In the compounds of the above general formulae (II) and (III), each of m, n, a, b, c and d is an integer of 1 or greater, and they are properly determined so that the compounds preferably have a weight average molecular weight in the range of 2,000 to 8,000.

In the present first invention, as a method of adjusting the molecular weight distributions (weight average molecular weight and polydispersity[Mw/Mn]) of the compound of the above general formula (I) and the compound(s) of the above general formula (II) and/or the above general formula (III), any molecular weight adjusting method can be employed so long as molecular weight fractioning can be attained, while a lubricant containing compounds purified by a supercritical extraction method is preferred. When the compounds are subjected to molecular weight fractioning by a supercritical extraction method, there can be obtained a lubricant containing compounds suitably having the above molecular weight distributions.

In the present first invention, the weight ratio of the above perfluoropolyether compound having an end moiety containing a phosphazene ring and the perfluoropolyether compound having an end moiety containing a hydroxyl group in the lubricant is preferably 2:8 to 8:2, particularly preferably 6:4 to 4:6. When the content of the perfluoropolyether compound having an end moiety containing a phosphazene ring is smaller than 2:8, the content of the perfluoropolyether compound having an end moiety containing a hydroxyl group is too large, and the adhesion of the entire lubricant layer to the protective layer is intensified. As a result, the lubrication performance may be low in some cases, which may cause head clash in such cases. Further, since the heat resistance of the lubricant is low, there may be caused a fly sticking problem or a corrosion problem. When the content of the perfluoropolyether compound having an end moiety containing a phosphazene ring is greater than 8:2, the adhesion of the entire lubricant layer to the protective layer is low, so that a fly sticking problem or a corrosion problem may be caused in some cases. Further, a migration problem is liable to take place.

In the present first invention, the lubricant layer may contain conventional various additives known as a lubricant for a lubricant layer of a magnetic recording disk, such as a perfluoropolyether-based lubricant, as required so long as the object of the present invention is not impaired.

The magnetic recording disk of the present invention is suitable for use as a magnetic recording disk in the LUL method, while it can be also used with the CSS method or a contact-recording method.

Further, according to the present invention first invention, there is provided a process for manufacturing a magnetic recording disk, which comprises forming a magnetic layer on a substrate, forming a protective layer on the magnetic layer and forming a lubricant layer on the protective layer, the method comprising forming the lubricant layer from a lubricant containing a perfluoropolyether compound having an end moiety containing a phosphazene ring and a perfluoropolyether compound having an end moiety containing a hydroxyl group.

When a lubricant prepared by mixing the above two perfluoropolyether compounds is used for forming a lubricant layer, there can be properly manufactured a magnetic recording disk having a lubricant layer containing a perfluoropolyether compound having an end moiety containing a phosphazene ring and a perfluoropolyether compound having an end moiety containing a hydroxyl group.

In the present first invention, the method of forming the lubricant layer is not critical and can be selected, for example, from a dip coating method, a spin coating method, a spray coating method, a vaper coating method, or the like. In the present first invention, when the lubricant layer is formed from a dispersion of the lubricant in a solvent, any solvent can be selected so long as it can properly disperse the lubricant. Particularly, a fluorine-containing solvent is preferred, since it can properly disperse and dissolve the lubricant containing the perfluoropolyether as a main chain. When Vertrel XF supplied by DU PONT-MITSUI FLUOROCHEMICALS COMPANY,LTD., or HFE7100 supplied by 3M Co., Ltd. is used as a fluorine-containing solvent, particularly preferably, they can properly disperse or dissolve the compound of the general formula (I) and the compound of the general formula (II) and/or the compound of the general formula (III) to form a suitable solution.

In the present first invention, the thickness of the lubricant layer is preferably in the range of 0.5 to 1.8 nm, particularly preferably in the range of 0.7 to 1.5 nm. When the above thickness is less than 0.5 nm, undesirably, the lubrication performance of the lubricant layer is impaired. When it exceeds 1.8 nm, undesirably, an upper layer portion of the lubricant layer may be caused to have low adhesion to the protective layer in some cases.

In the present first invention, preferably, the magnetic recording disk is heat-treated after the lubricant layer is formed. The above heat treatment is preferred in the present invention, since the heat treatment can improve adhesion between the lubricant layer and the protective layer and can improve the adhesion strength of the lubricant layer. The heat treatment is preferably carried out at a temperature of 100 to 180° C. When the heat treatment temperature is lower than 100° C., the adhesion is not sufficient. When it exceeds 180° C., undesirably, the lubricant may be thermally decomposed. Further, the heat treatment is preferably carried out for 30 to 120 minutes.

In the present first invention, the protective layer is preferably a carbon-containing protective layer. The carbon-containing protective layer has high affinity with the end functional group containing a hydroxyl group and the end functional group containing a phosphazene ring, and it can serve to improve the adhesion of the lubricant layer to the protective layer. The carbon-containing protective layer is preferably a hydrogenated carbon protective layer or other protective layer such as a nitrogenated carbon protective layer or a hydrogenated-nitrogenated carbon protective layer. The protective layer preferably has a thickness of 3 to 8 nm. When the above thickness is less than 3 nm, the protective layer does not fully function as such, and a head clash problem may be caused. When it exceeds 8 nm, the distance between the magnetic layer and a magnetic head is too large, which is undesirable for attaining a high S/N ratio.

In the present first invention, the substrate is preferably a glass substrate. A glass substrate is excellent in surface smoothness and suitable for high-density recording. As a glass substrate, a chemically strengthened aluminosilicate glass substrate is preferred.

In the present first invention, the substrate preferably has a surface roughness, Rmax, of 6 nm or less and a surface roughness, Ra, of 0.6 nm or less. When the substrate has the above smoothness, the flying height of a magnetic head can be set to be 12 nm or less, while there is a problem that the lubricant layer is liable to move due to the surface smoothness. In the present invention, the movement of the lubricant layer can be properly suppressed. The above Rmax and Ra are as defined in JIS B0601.

In the present first invention, the magnetic layer is not specially limited, and it may be a magnetic layer according to an in-plane recording method or may be a magnetic layer according to a perpendicular recording method. A CoPt-based magnetic layer is preferred since a high coercive force and a high reproduction output can be obtained.

In the magnetic recording disk of the present first invention, an undercoat layer may be provided between the substrate and the magnetic layer, and a seed layer may be provided between the undercoat layer and the substrate. The undercoat layer is selected from a Cr layer or an alloy layer such as a CrMo, CrW, CrV or CrTi alloy layer. The seed layer is selected from an NiAl or an AlRu alloy layer.

The present second invention will be explained below. The magnetic recording disk according to the present second invention comprises a substrate, a magnetic layer formed on the substrate, a protective layer formed on the magnetic layer and a lubricant layer formed on the protective layer, the lubricant layer containing a perfluoropolyether compound having an end moiety containing a hydroxyl group on the protective layer side, particularly, in a portion forming a boundary to the protective layer; and containing a perfluoropolyether compound having an end moiety containing a phosphazene ring on the other surface side, that is, the outermost surface side of the magnetic recording disk (outermost surface side of the magnetic recording disk toward a magnetic head).

As discussed in the beginning of the explanation of the present first invention, it was difficult to use a perfluoropolyether compound having an end moiety containing a phosphazene ring or a perfluoropolyether compound having an end moiety containing a hydroxyl group alone as a lubricant. However, the present inventors prepared a magnetic recording disk having a lubricant layer containing a perfluoropolyether compound having an end moiety containing a hydroxyl group on the protective layer side, particularly, a portion forming a boundary to the protective layer, and a lubricant layer containing a perfluoropolyether compound having an end moiety containing a phosphazene ring on the other surface side, that is, the outermost surface portion of the magnetic recording disk (outermost surface portion of the magnetic recording disk toward a magnetic head), and the present inventors tested the magnetic recording disk and unexpectedly found that their suitable properties are uniquely intensified and that their defects can be suppressed, which has led to the present second invention.

It is assumed that the above unexpected result can be produced as follows. The perfluoropolyether compound having an end moiety containing a hydroxyl group works mainly as an adhesion-promoting layer for improving the entire lubricant layer in adhesion to the protective layer, and the perfluoropolyether compound having an end moiety containing a phosphazene ring works mainly as a heat-resistant layer for imparting the lubricant layer with durability against pyrolysis.

In the present second invention, preferably, the above lubricant layer has a structure in which a second lubricant layer containing a perfluoropolyether compound having an end moiety containing a phosphazene ring is formed on a first lubricant layer containing a perfluoropolyether compound having an end moiety containing a hydroxyl group. Other lubricant layer may be provided between the first and second lubricant layer so long as the object of the present invention is not impaired. A lubricant layer in which the above first lubricant layer is in contact with the above second lubricant layer is particularly preferable.

In the present second invention, the above perfluoropolyether compound having an end moiety containing a hydroxyl group, to be contained on the protective layer side of the lubricant layer, is preferably a perfluoropolyether compound having an end moiety containing three or more hydroxyl groups. When the number of the above hydroxyl groups as a total is less than 3, the performance of adhesion to the protective layer is insufficient, and a fly sticking problem or a migration problem is liable to take place. Further, when the number of the above hydroxyl groups as a total is too large, the performance of adhesion to the protective layer is too strong, and as a result, the lubrication performance is impaired, so that a head clash problem is liable to take place.

The above perfluoropolyether compound having an end moiety containing a hydroxyl group, preferably three or more hydroxyl group, is not specially limited and can be selected from known compounds that can be used in a lubricant layer of a magnetic recording disk. Above all, preferred is a compound having a structure represented by the general formula (IV), wherein each of r and s is an integer of 1 or greater.

In the above general formula (IV), the perfluoropolyether main chain is represented by and the end moiety is represented by the following group.

The compound of the above general formula (IV) has end functional groups containing two hydroxyl groups each, and it has properly high affinity with the protective layer and can serve to allow the lubricant layer to adhere to the protective layer.

The compound of the above general formula (IV) preferably has a weight average molecular weight of 2,000 to 7,000 and a polydispersity[Mw/Mn] of 1.2 or less. When the compound of the above general formula (IV) has the above molecular weight distribution, the compound is suitable as a lubricant having a perfluoropolyether main chain length (length of a main chain) with a lubrication performance suitable for a magnetic recording disk.

A lubricant containing the compound of the general formula (IV) is liable to contain low molecular weight polymer compounds having end moieties containing less hydroxyl group than that of the compound of the general formula (IV) and is also liable to contain impurities. When the molecular weight as defined in the present invention is attained, the above compound and impurities can be excluded, and the function of the present invention can be properly exhibited. Compounds of the above general formula (IV) having a weight average molecular weight of 3,000 to 6,000 and a polydispersity[Mw/Mn] of 1.1 or less are particularly preferred. When the weight average molecular weight is less than 2,000, undesirably, a large amount of impurities may be contained in some cases. Further, when it exceeds 7,000, undesirably, the viscosity of the compound is high, which may cause fly sticking. When the polydispersity [Mw/Mn] exceeds 1.2, the molecular weight distribution is too broad, and undesirably, a low molecular weight component and a high molecular weight component come to be contained.

In the present second invention, the perfluoropolyether compound having an end moiety containing a phosphazene ring, to be contained on the surface side of the lubricant layer, is not specially limited, and the perfluoropolyether compound having an end moiety containing a phosphazene ring as explained in the present first invention can be applied. The molecular weight distribution of the compound for constituting the lubricant layer can be adjusted by the same method as that explained in the present first invention. Further, additives to the lubricant layer can be also selected from those explained in the present first invention.

In the present second invention, the first lubricant layer preferably has a thickness of 0.5 to 1.2 nm. When the above thickness is less than 0.5 nm, the performance of adhesion to the protective layer may be decreased in some cases. Further, the second lubricant layer preferably has a thickness of 0.1 to 0.6 nm. When the above thickness is less than 0.1 nm, it is not sufficient for attaining the heat resistance. When it exceeds 0.6 nm, undesirably, a lubricant may be transferred to form a deposit on the magnetic head side in some cases.

In the present second invention, the entire lubricant layer including the above first and second lubricant layers preferably has a total thickness of 0.6 to 1.8 nm. When the above thickness is less than 0.6 nm, the lubrication performance of the lubricant layer is not sufficient, and a head clash problem may take place in some cases. Further, when it exceeds 1.8 nm, undesirably, a fly sticking problem or a corrosion problem may be caused to take place in some cases. Further, more preferably, the above first lubricant layer is adjusted to have a thickness equivalent to, or greater than, the thickness of the above second lubricant layer.

According to the present second invention, there is also provided a process for manufacturing a magnetic recording disk, which comprises forming a magnetic layer on a substrate, forming a protective layer on the magnetic layer and forming a lubricant layer on the protective layer, the method comprising forming the lubricant layer by forming a layer from a lubricant containing a perfluoropolyether compound having an end moiety containing a hydroxyl group and then forming a layer from a lubricant containing a perfluoropolyether compound having an end moiety containing a phosphazene ring.

When the lubricant layer is formed as described above, there can be properly manufactured the magnetic recording disk of the present invention having the lubricant layer containing a perfluoropolyether compound having an end moiety containing a hydroxyl group on the protective layer side and containing a perfluoropolyether compound having an end moiety containing a phosphazene ring on the surface side of the lubricant layer.

In the manufacturing process according to the present second invention, preferably, the first lubricant layer is formed from a solution of a perfluoropolyether compound having an end moiety containing a hydroxyl group (Compound A) in a fluorine-containing solvent capable of dispersing or dissolving Compound A, and the second lubricant layer is formed from a solution of a perfluoropolyether compound having an end moiety containing a phosphazene ring (Compound B) in a fluorine-containing solvent which is capable of dispersing or dissolving Compound B but substantially does not disperse or dissolve Compound A. When the lubricant layer is formed as described above, the second lubricant layer can be formed without causing any change on the above first lubricant layer, so that the performance and thickness of the lubricant layer can be properly controlled.

The fluorine-containing solvent that disperses or dissolves the compound of the above general formula (IV) includes Vertrel XF supplied by DU PONT-MITSUI FLUOROCHEMICALS COMPANY,LTD., or HFE7100 supplied by 3M Co., Ltd. Further, the fluorine-containing solvent that disperses or dissolves the compound of the general formula (I) but substantially does not disperse or dissolve the compound of the general formula (IV) includes PF5060 and PF5080 supplied by 3M Co., Ltd. Vertrel XF disperses or dissolves both the compound of the general formula (IV) and the compound of the general formula (I).

In the present second invention, the method of forming the lubricant layer is not critical and can be selected from layer forming methods such as a dip coating method, a spin coating method, a spray method, a vaper coating method, and the like.

In the present second invention, preferably, the magnetic recording disk is heat-treated after the lubricant layer is formed. The above heat treatment is preferred in the present invention, since the heat treatment can improve adhesion between the lubricant layer and the protective layer and can improve the adhesion strength of the lubricant layer. The heat treatment is preferably carried out at a temperature of 100 to 180° C. When the heat treatment temperature is lower than 100° C., the adhesion is not sufficient. When it exceeds 180° C., undesirably, the lubricant may be thermally decomposed. Further, the heat treatment is preferably carried out for 30 to 120 minutes. It is preferred to carry out the above heat treatment after the formation of the above first lubricant layer and before the formation of the above second lubricant layer, since the performance of adhesion of the first lubricant layer to the protective layer can be further improved in this case.

In the present second invention, an undercoat layer may be provided between the substrate and the magnetic layer, and a seed layer may be provided between the undercoat layer and the substrate. The protective layer, the substrate, the magnetic layer, the undercoat layer and the seed layer can be selected from those explained with regard to the present first invention. The present second invention is suitably applied to a magnetic recording disk according to the LUL method. Like the present first invention, the present second invention can be also applied to a magnetic recording disk according to the CSS method and a magnetic recording disk according to a contact-recording method.

EXAMPLES

The present invention will be explained further in detail with reference to Examples hereinafter, while the present invention shall not be limited by these Examples.

In Examples, magnetic recording disks were evaluated for performances by the following methods.

(1) Lubricant Layer Adhesion Performance Test

A lubricant layer was tested for evaluating a performance of adhesion to a protective layer. First, a magnetic recording disk is measured for a lubricant layer thickness by an FTIR (Fourier transform infrared spectroscopy) method. Then, the magnetic recording disk is immersed in a fluorine-containing solvent, Vertrel XF, for 1 minute. When the magnetic recording disk is immersed in the solvent, a lubricant layer portion having low adhesion strength comes to be dispersed or dissolved in the solvent, but a portion having high adhesion strength can remain on the protective layer. Then, the magnetic recording disk is drawn up from the solvent and again measured for a lubricant layer thickness by the FTIR method. The ratio of the thickness of the lubricant layer after the immersion in the solvent to the thickness of the lubricant layer before the immersion in the solvent will be called a lubricant layer bonded ratio. It can be said that the higher the bonded ratio is, the higher the performance of adhesion of the lubricant layer to the protective layer is. It is said that the bonded ratio is preferably at least 70%.

(2) Lubricant Layer Coating Ratio

A lubricant layer coating ratio is measured by an X-ray photoelectron spectroscopy known in U.S. Pat. No. 6,099,981 (The coating ratio is defined as coverage ratio β in U.S. Pat. No. 6,099,981).

It is shown that the higher the lubricant layer coating ratio is, the more uniformly the magnetic recording disk surface is coated with a lubricant layer, and the head clash problem and the corrosion problem can be suppressed to a greater degree. That is, with an increase in the value of the lubricant layer coating ratio, the magnetic recording disk surface is more efficiently protected, and the exposure ratio of the protective layer surface decreases. Therefore, the magnetic recording disk surface has a higher lubrication performance, and the magnetic recording disk surface can be protected from substances that are liable to cause the corrosion problem and the fly sticking problem, such as acidic contaminants and siloxane-based contaminants present in the atmosphere of a magnetic recording disk drive unit.

(3) LUL Durability Test

The LUL test uses a 2.5-inch (65-mm) magnetic recording disk drive unit that turns at a rate of 5,400 rpm and a magnetic head that is operated with a flying height of 12 nm. A negative pressure air bearing surface slider (NPAB slider) is used as a slider of the magnetic head, and a GMR magneto-resistance effect element is used as a reproducing element. A shield portion is formed of an NiFe alloy. A magnetic recording disk is placed in the above magnetic recording disk drive unit, and the LUL operation is continuously carried out with the above magnetic head, to measure the number of times of the LUL operation durability.

After the LUL durability test, the magnetic recording disk surface and the magnetic head surface are observed visually and through an optical microscope for failures such as scratches and soiling. In the LUL durability test, a magnetic recording disk is required to be durable against at least 400,000 times of the LUL operations, and a magnetic recording disk durable against at least 600,000 times of the LUL operations is suitable. In a use environment of a general hard disk drive (HDD), it is said that more than 600,000 times of the LUL operations are conducted when HDD is used for approximately 10 years.

(4) Fly Sticking Test

100 Magnetic recording disks are glide-tested with a glide head with a flying height of 6 nm, to see whether or not a fly sticking phenomenon is caused. When a fly sticking phenomenon takes place, the flying position of the glide head changes to an unusual position, so that the occurrence of the fly sticking can be detected by monitoring a signal from a piezoelectric element attached to the glide head.

Example 1

Figure 1:
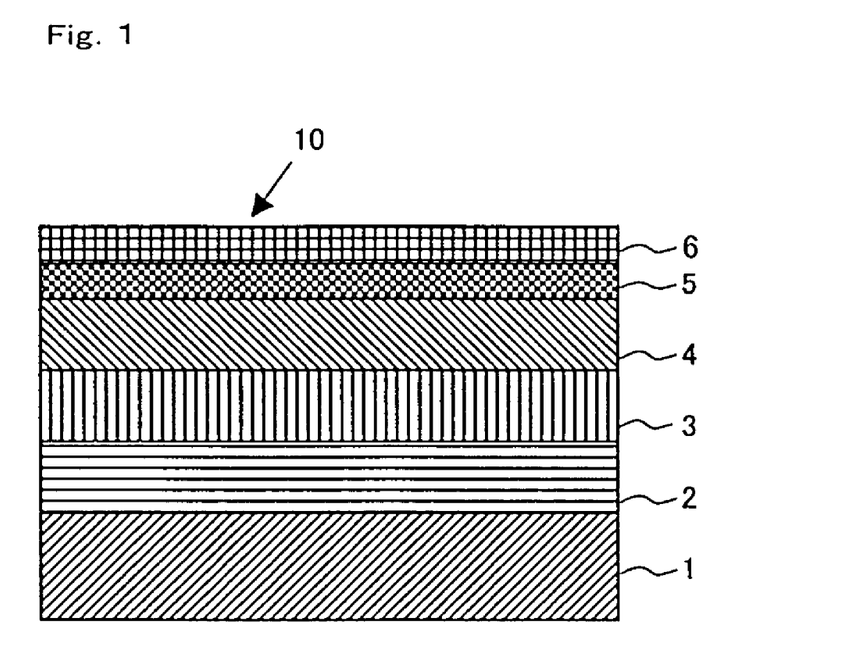
FIG. 1 is a schematic cross-sectional view of one embodiment of the magnetic recording disk according to the present first invention.

FIG. 1 is cross-sectional view of a magnetic recording disk 10 for schematically showing the layer structure of one embodiment of the magnetic recording disk of the present first invention. In the magnetic recording disk 10, a seed layer 2, an undercoat layer 3, a magnetic layer 4, a protective layer 5 and a lubricant layer 6 are consecutively formed on a substrate 1. The substrate 1 is a chemically strengthened aluminosilicate glass substrate, and the main surface thereof is mirror-polished so as to have an Rmax of 4.8 nm and an Ra of 0.43 nm. Further, the glass substrate has a diameter of 65 mm and a thickness of 0.635 mm and is used for a 2.5-inch magnetic recording disk.

The seed layer 2 is formed of an NiAl alloy containing 50 mol % of Ni and 50 mol % of Al and has a thickness of 30 nm.

The undercoat layer 3 is formed of a CrMo alloy containing 80 mol % of Cr and 20 mol % of Mo and has a thickness of 8 nm.

The magnetic layer 4 is formed of a CoPt alloy containing 62 mol % of Co, 20 mol % of Cr, 12 mol % of Pt and 6 mol % of B and has a thickness of 15 nm.

The protective layer 5 is formed of hydrogenated carbon and has a thickness of 5 nm.

The lubricant layer 6 is a lubricant layer containing a perfluoropolyether compound having an end moiety containing a phosphazene ring, represented by the general formula (I), and a perfluoropolyether compound having an end moiety containing a hydroxyl group, represented by the general formula (II), and having a thickness of 1 nm.

The process for manufacturing the magnetic recording disk 10 of this Example will be explained below.

First, the seed layer 2, the undercoat layer 3 and the magnetic layer 4 are consecutively formed on the substrate 1 in an Ar gas atmosphere by a DC magnetron sputtering method. Then, the protective layer 5 was formed by sputtering a carbon target in an Ar gas/hydrogen gas mixed atmosphere (having a hydrogen gas content of 30% by volume) similarly according to a DC magnetron sputtering method.

Then, a perfluoropolyether compound (I) having an end moiety containing a phosphazene ring, represented by the general formula (I), which was purified to have a weight average molecular weight of 3,000 and a polydispersity [Mw/Mn] of 1.05 by a supercritical extraction method (a mixture of a compound in which a $CF_3$ group of a phenoxy group was positioned in the m-position and one of its end moieties contained a hydroxyl group and a compound in which the two end moieties had a phosphazene ring each) and a perfluoropolyether compound (II) having an end moiety containing a hydroxyl group, represented by the general formula (II), which was purified to have a weight average molecular weight of 4,000 and a polydispersity [Mw/Mn] of 1.06 by a supercritical extraction method, were mixed in a weight ratio of 1:1 to prepare a lubricant. And, there was prepared a solution (dispersion) of 0.02% by weight of the mixture (lubricant) in Vertrel XF that was fluorine-containing solvent supplied by DU PONT-MITSUI FLUOROCHEMICALS COMPANY, Ltd. The above solution (dispersion) was used as a coating solution. The above magnetic recording disk having layers formed up to the protective layer 5 was dipped in the solution to form the lubricant layer 6. Then, the magnetic recording disk 10 was heat-treated in a vacuum calcining furnace at 130° C. for 90 minutes, to give a 2.5-inch magnetic recording disk 10 of this Example.

The above magnetic recording disk 10 was evaluated for performances. Table 1 shows the results.

Examples 2-5 and Comparative Examples 1 and 2

A magnetic recording disk was prepared in the same manner as in Example 1 except that the lubricant was replaced with a mixture (lubricant) prepared by mixing the perfluoropolyether compound (I) having an end moiety containing a phosphazene ring, represented by the general formula (I), with the perfluoropolyether compound (II) having an end moiety containing a hydroxyl group, represented by the general formula (II) in a compound (I):compound (II) mixing ratio, by weight, of 4:6 (Example 2), 2:8 (Example 3), 6:4 (Example 4) or 8:2 (Example 5). Further, a magnetic recording disk was prepared in the same manner as in Example 1 except that the lubricant was replaced with a lubricant containing the compound of the general formula (II) alone (Comparative Example 1) or a lubricant containing the compound of the general formula (I) alone (Comparative Example 2).

The thus-obtained magnetic recording disks were evaluated for performances. Table 1 shows the results.

TABLE 1

| | (I):(II) (Weight ratio) | Bonded ratio | LUL durability test | | | Fly sticking test | |
|---|---|---|---|---|---|---|---|
| | | | Number of times of durable operations | Disk surface | Head surface | Acceptance ratio | |
| Ex. 1 | 1:1 | 84% | 800,000 times | Excellent | Excellent | 100% | No fly sticking |
| Ex. 2 | 4:6 | 86% | 800,000 times | Excellent | Excellent | 100% | No fly sticking |
| Ex. 3 | 2:8 | 87% | 600,000 times | Excellent | Excellent | 100% | No fly sticking |
| Ex. 4 | 6:4 | 80% | 800,000 times | Excellent | Excellent | 100% | No fly sticking |
| Ex. 5 | 8:2 | 77% | 600,000 times | Excellent | Excellent | 100% | No fly sticking |
| C Ex. 1 | 0:1 | 89% | Failure after 400,000 times | Scratched by head clash | Head element and shield portion corroded, scratched by head clash | 50% | Fly sticking occurred |
| C Ex. 2 | 1:0 | 46% | Failure after 320,000 times | Soiled | Head element and shield portion corroded, soiled | 48% | Fly sticking occurred |
| C Ex. 4 | — | 40% | Failure after 200,000 times | Soiled | Head element and shield portion corroded, soiled | 11% | Fly sticking occurred |

Ex. = Example,
C Ex. = Comparative Example

Examples 6-10 and Comparative Example 3

A magnetic recording disk was prepared in the same manner as in Example 1 except that the compound of the general formula (II) was replaced with a perfluoropolyether compound (III) having an end moiety containing a hydroxyl group, represented by the general formula (III), which was purified to have a weight average molecular weight of 4,000 and a polydispersity[Mw/Mn] of 1.20 by a super critical extraction method (Example 6).

Further, A magnetic recording disk was prepared in the same manner as in Example 6 except that the lubricant was replaced with a mixture (lubricant) prepared by mixing the perfluoropolyether compound (I) having an end moiety containing a phosphazene ring, represented by the general formula (I), with the perfluoropolyether compound (III) having an end moiety containing a hydroxyl group, represented by the general formula (III) in a compound (I):compound (III) mixing ratio, by weight, of 4:6 (Example 7), 2:8 (Example 8), 6:4 (Example 9) or 8:2 (Example 10).

Further, a magnetic recording disk was prepared in the same manner as in Example 6 except that the lubricant was replaced with a lubricant containing the compound of the general formula (III) alone (Comparative Example 3).

The thus-obtained magnetic recording disks were evaluated for performances. Table 2 shows the results.

TABLE 2

|  | (I):(III) (Weight ratio) | Bonded ratio | LUL durability test | | | Fly sticking test | |
|---|---|---|---|---|---|---|---|
|  |  |  | Number of times of durable operations | Disk surface | Head surface | Acceptance ratio |  |
| Ex. 6 | 1:1 | 75% | 800,000 times | Excellent | Excellent | 100% | No fly sticking |
| Ex. 7 | 4:6 | 78% | 800,000 times | Excellent | Excellent | 100% | No fly sticking |
| Ex. 8 | 2:8 | 81% | 600,000 times | Excellent | Excellent | 100% | No fly sticking |
| Ex. 9 | 6:4 | 73% | 800,000 times | Excellent | Excellent | 100% | No fly sticking |
| Ex. 10 | 8:2 | 71% | 600,000 times | Excellent | Excellent | 100% | No fly sticking |
| C Ex. 3 | 0:1 | 80% | Failure after 400,000 times | Soiled scratched by head clash | Head element and shield portion corroded, soiled, scratched by head clash | 50% | Fly sticking occurred |

Ex. = Example,
C Ex. = Comparative Example

Comparative Example 4

A magnetic recording disk was prepared in the same manner as in Example 1 except that the lubricant was replaced with a perfluoropolyether compound having an end moiety containing a hydroxyl group or a perfluoropolyether compound having a structure of $HOCH_2—CF_2O—(C_2F_4O)_p—(CF_2O)_q—CH_2OH$.

The thus-obtained magnetic recording disk was evaluated for performances. Table 1 shows the results.

As shown in Tables 1 and 2, all of the magnetic recording disks having the lubricant layer according to the present invention (Examples 1 to 9) had a bonded ratio of 70% or more. In the LUL durability test, all of the above magnetic recording disks showed operation durability of 600,000 times or more, and after the durability test, failures such as scratches or soiling were not observed on any disk surface or head surface. Further, no fly sticking phenomenon took place, and all the magnetic recording disks showed an acceptance ratio of 100%.

In contrast, in the magnetic recording disks having a lubricant layer containing the compound of the general formula (II) or (III) alone (Comparative Examples 1 and 3), the bonded ratio was high, but they were defective when tested in the LUL durability test. Further, a fly sticking phenomenon took place.

Further, in the magnetic recording disk having a lubricant layer containing the compound of the general formula (I) alone (Comparative Example 2) and the magnetic recording disk having a lubricant layer of prior art (Comparative Example 4), the bonded ratio was low, and they were defective when tested in the LUL durability test. Further, a fly sticking phenomenon took place.

Example 11

Figure 2:
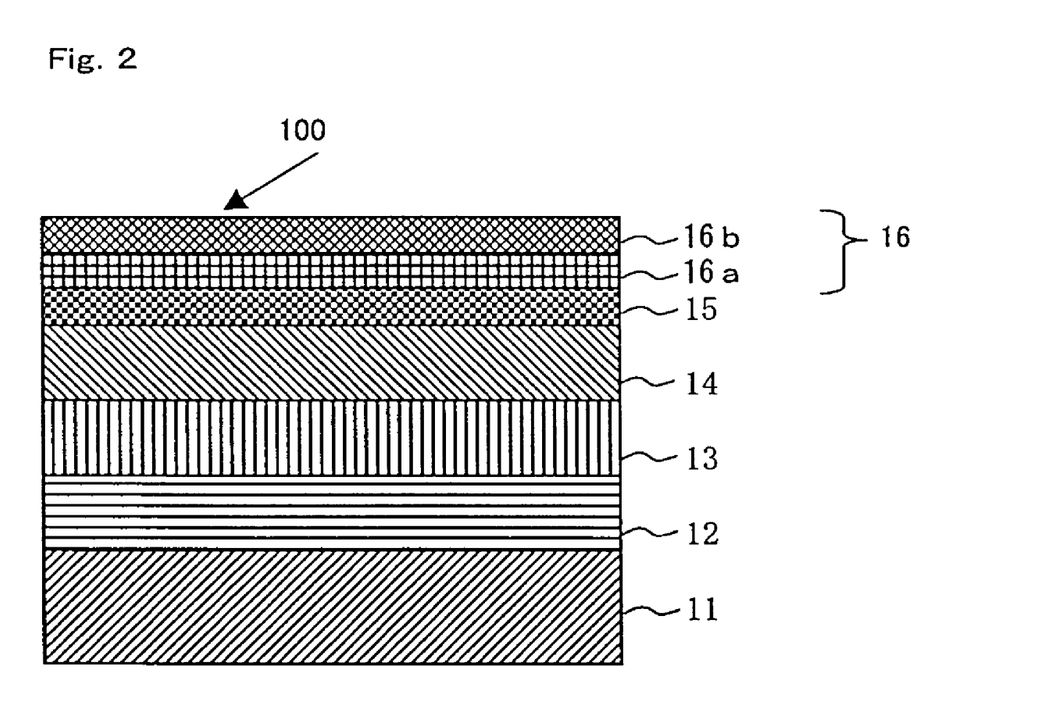
FIG. 2 is a schematic cross-sectional view of one embodiment of the magnetic recording disk according to the present second invention.

FIG. 2 is a cross-sectional view of a magnetic recording disk 100 for schematically showing the layer structure of one embodiment of the magnetic recording disk of the present second invention. In the magnetic recording disk 100, a seed layer 12, an undercoat layer 13, a magnetic layer 14, a protective layer 15 and a lubricant layer 16 are consecutively formed on a substrate 11. The lubricant layer 16 has a first lubricant layer 16a and a second lubricant layer 16b.

The substrate 11 is a chemically strengthened aluminosilicate glass substrate, and the main surface thereof is mirror-polished so as to have an Rmax of 4.8 nm and an Ra of 0.43 nm. Further, the glass substrate has a diameter of 65 mm and a thickness of 0.635 mm and is used for a 2.5-inch magnetic recording disk.

The seed layer 12 is formed of an NiAl alloy containing 50 mol % of Ni and 50 mol % of Al and has a thickness of 30 nm.

The undercoat layer 13 is formed of a CrMo alloy containing 80 mol % of Cr and 20 mol % of Mo and has a thickness of 8 nm.

The magnetic layer 14 is formed of a CoPt alloy containing 62 mol % of Co, 20 mol % of Cr, 12 mol % of Pt and 6 mol % of B and has a thickness of 15 nm.

The protective layer 15 is formed of hydrogenated carbon and has a thickness of 5 nm.

The lubricant layer 16a is a lubricant layer containing perfluoropolyether compound having an end moiety containing a hydroxyl group, represented by the general formula (IV), and has a thickness of 0.8 nm.

The lubricant layer 16b is a lubricant layer containing a perfluoropolyether compound having an end moiety containing a phosphazene ring, represented by the general formula (I), and has a thickness of 0.2 nm.

The lubricant layer 16 has a thickness of 1 nm

The process for manufacturing the magnetic recording disk 100 of this Example will be explained below.

First, the seed layer 12, the undercoat layer 13 and the magnetic layer 14 are consecutively formed on the substrate 11 in an Ar gas atmosphere by a DC magnetron sputtering method. Then, the protective layer 15 was formed by sputtering a carbon target in an Ar gas/hydrogen gas mixed atmosphere (having a hydrogen gas content of 30% by volume) similarly according to a DC magnetron sputtering method.

Then, a perfluoropolyether compound (IV) having an end moiety containing a hydroxyl group, represented by the general formula (IV), which was purified to have a weight average molecular weight of 4,000 and a polydispersity

[Mw/Mn] of 1.06 by a supercritical extraction method, was dissolved (dispersed) in Vertrel XF that was fluorine-containing solvent supplied by DU PONT-MITSUI FLUOROCHEMICALS COMPANY,LTD., to prepare a solution (dispersion) having a perfluoropolyether compound concentration of 0.02% by weight.

The above solution (dispersion) was used as a coating solution. The above magnetic recording disk having layers formed up to the protective layer 15 was dipped in the solution to form the lubricant layer 16a. Then, the magnetic recording disk was heat-treated in a vacuum calcining furnace at 130° C. for 90 minutes. The magnetic recording disk was measured for a lubricant layer 16a thickness by an FTIR method to show 0.8 nm.

Then, a perfluoropolyether compound (I) having an end moiety containing a phosphazene ring, represented by the general formula (I), which was purified to have a weight average molecular weight of 3,000 and a polydispersity [Mw/Mn] of 1.05 by a supercritical extraction method (a mixture of a compound in which a $CF_3$ group of a phenoxy group was positioned in the m-position and one of its end moieties contained a hydroxyl group and a compound in which the two end moieties had a phosphazene ring each), was dissolved (dispersed) in PF5060 that was a fluorine-containing solvent supplied by 3M Co., Ltd., to prepare a solution (dispersion) having a perfluoropolyether compound concentration of 0.005% by weight.

The above solution (dispersion) was used as a coating solution. The above magnetic recording disk having layers formed up to the lubricant layer 16a was dipped in the solution to form the lubricant layer 16b. The magnetic recording disk was measured for a lubricant layer 16 thickness by an FTIR method to show 1 nm.

The difference between the thickness of the lubricant layer 16 and the thickness of the lubricant layer 16a was 0.2 nm, so that the lubricant layer 16 had a thickness of 0.2 nm.

The magnetic recording disk having layers formed up to the lubricant layer 16a was immersed in PF5060 that was a fluorine-containing solvent supplied by 3M Co., Ltd., to test whether or not the lubricant layer 16a was dispersed or dissolved in the PF5060. Both before and after the immersion, the lubricant layer 16a had a thickness of 0.8 nm, so that it was found that the lubricant layer 16a was insoluble in PF5060.

The 2.5-inch magnetic recording disk 100 of this Example was manufactured by the above-explained process. The magnetic recording disk was evaluated for performances. Tables 3 and 4 show the results.

Examples 12-14 and Comparative Examples 5 and 6

Magnetic recording disks were prepared in the same manner as in Example 11 except that the thickness of each of the first and second lubricant layers 16a and 16b of the lubricant layer 16 was changed as shown in Table 3.

The thus-obtained magnetic recording disks were evaluated for performances. Tables 3 and 4 show the results.

Comparative Example 7

A magnetic recording disk was prepared in the same manner as in Example 11 except that the lubricant layer 16 was replaced with a 1 nm thick lubricant layer that was formed only from a perfluoroalkylpolyether compound having an end moiety containing a hydroxyl group or a perfluoropolyether compound having a structure of $HOCH_2$—$CF_2O$—$(C_2F_4O)_r$—$(CF_2O)_s$—$CH_2OH$.

The magnetic recording disk was evaluated for performances. Tables 3 and 4 show the results.

TABLE 3

|  | Thickness of first lubricant layer | Thickness of second lubricant layer | Bonded ratio | Lubricant layer coating ratio |
|---|---|---|---|---|
| Ex. 11 | 0.8 nm | 0.2 nm | 84% | 96% |
| Ex. 12 | 0.7 nm | 0.3 nm | 81% | 95% |
| Ex. 13 | 0.5 nm | 0.5 nm | 80% | 95% |
| Ex. 14 | 0.3 nm | 0.7 nm | 70% | 94% |
| CEx. 5 | 1 nm | 0 | 89% | 82% |
| CEx. 6 | 0 | 1 nm | 46% | 81% |
| CEx. 7 | — |  | 40% | 81% |

Ex. = Example, CEx. = Comparative Example

TABLE 4

|  | LUL durability test ||| Fly sticking test ||
|---|---|---|---|---|---|
|  | Number of times of durable operations | Disk surface | Head surface | Acceptance ratio |  |
| Ex. 11 | 800,000 times | Excellent | Excellent | 100% | No fly sticking |
| Ex. 12 | 800,000 times | Excellent | Excellent | 100% | No fly sticking |
| Ex. 13 | 800,000 times | Excellent | Excellent | 100% | No fly sticking |
| Ex. 14 | 600,000 times | Excellent | Excellent | 100% | No fly sticking |
| C Ex. 5 | Failure after 400,000 times | Scratched by head clash | Head element and shield portion corroded, scratched by head clash | 50% | Fly sticking occurred |
| C Ex. 6 | Failure after 320,000 times | Soiled | Head element and shield portion corroded, soiled | 48% | Fly sticking occurred |

TABLE 4-continued

| | | LUL durability test | | Fly sticking test | |
|---|---|---|---|---|---|
| | Number of times of durable operations | Disk surface | Head surface | Acceptance ratio | |
| C Ex. 7 | Failure after 200,000 times | Soiled | Head element and shield portion corroded, soiled | 11% | Fly sticking occurred |

As shown in Tables 3 and 4, all of the magnetic recording disks of the present invention (Examples 11 to 14) had a bonded ratio of at least 70% and had a high lubricant layer coating ratio of as high as at least 90%. In the LUL durability test, all of the above magnetic recording disks showed operation durability of 600,000 times or more, and after the durability test, failures such as scratches or soiling were not observed on any disk surface or head surface. Further, no fly sticking phenomenon took place, and all the magnetic recording disks showed an acceptance ratio of 100%.

In contrast, in the magnetic recording disks having a single-layered lubricant layer formed from the compound of the general formula (IV) alone or the compound of the general formula (I) alone (Comparative Examples 5 and 6) and the magnetic recording disk having a lubricant layer formed according to prior art (Comparative Example 7), the lubricant layer coating ratio was low, they were defective when tested in the LUL durability test, and further, a fly sticking phenomenon took place. In Comparative Examples 6 and 7, further, the bonded ratio was low.

EFFECT OF THE INVENTION

According to the present invention, there can be obtained a magnetic recording disk having suitable lubrication performances, adhesion performances, heat-resisting performances and coating performances, so that the fly sticking problem, the corrosion problem, the head clash problem and the migration problem can be suppressed, and the magnetic recording disk of the present invention is therefore suitable for manufacturing a higher-capacity magnetic recording disk.

What is claimed is:

1. A magnetic recording disk comprising a substrate, a magnetic layer formed on the substrate, a protective layer formed on the magnetic layer and a two part lubricant layer formed on the protective layer, a first lubricant layer containing a perfluoropolyether compound having an end moiety containing a hydroxyl group on the protective layer side and a second lubricant layer containing a perfluoropolyether compound having an end moiety containing a phosphazene ring on the first lubricant layer, wherein said perfluoropolyether compound having an end moiety containing a hydroxyl group is a compound having a structure of the general formula (IV), wherein each of r and s is an integer of 1 or greater, and said perfluoropolyether compound having an end moiety containing a phosphazene ring is a compound having a structure of the general formula (I), wherein $R^1$ is a group represented by the formula (A), $R^2$ is a hydrogen atom or a group of the above formula (A), and each of p and q is an integer of 1 or greater.

2. The magnetic recording disk of claim 1, wherein the perfluoropolyether compound having an end moiety containing a hydroxyl group has a weight average molecular weight of 2,000 to 7,000 and a polydispersity[Mw/Mn] of 1.2 or less.

3. The magnetic recording disk of claim 1, wherein the perfluoropolyether compound having an end moiety containing a phosphazene ring has a weight average molecular weight of 2,000 to 7,000 and a polydispersity[Mw/Mn] of 1.1 or less.

4. A magnetic recording disk of claim 1, which is mounted in a magnetic recording disk drive unit according to the LUL method.

5. A magnetic recording disk unit comprising the magnetic recording disk as recited in claim 1 and a magnetic head.

6. The magnetic recording disk unit of claim 5, wherein said magnetic head has a negative pressure air bearing surface (NPAB) slider.

* * * * *